United States Patent
Incorvia et al.

(10) Patent No.: US 6,689,198 B2
(45) Date of Patent: *Feb. 10, 2004

(54) SELF-RETAINING ADSORBENT UNIT

(75) Inventors: Samuel A. Incorvia, North Tonawanda, NY (US); Peter R. Millen, Warsaw, NY (US); Leo J. Schwartz, Tonawanda, NY (US)

(73) Assignee: Multisorb Technologies, Inc., Buffalo, NY (US)

( * ) Notice: Subject to any disclaimer, the term of this patent is extended or adjusted under 35 U.S.C. 154(b) by 17 days.

This patent is subject to a terminal disclaimer.

(21) Appl. No.: 10/288,277

(22) Filed: Nov. 5, 2002

(65) Prior Publication Data

US 2003/0131733 A1 Jul. 17, 2003

Related U.S. Application Data

(63) Continuation-in-part of application No. 10/047,651, filed on Jan. 15, 2002, now Pat. No. 6,530,982.

(51) Int. Cl.[7] .......................... B01D 53/04; F25B 43/00
(52) U.S. Cl. .......................... 96/147; 55/515; 210/282; 62/474; 62/503
(58) Field of Search .................. 62/474, 503; 206/204; 210/282, 484; 96/147, 135, 136; 55/512, 513, 515

(56) References Cited

U.S. PATENT DOCUMENTS

| | | | |
|---|---|---|---|
| 4,116,649 A | 9/1978 | Cullen et al. | |
| 4,401,447 A | 8/1983 | Huber | |
| 4,405,347 A | 9/1983 | Cullen et al. | |
| 4,911,739 A | 3/1990 | Cullen et al. | |
| 4,994,185 A | 2/1991 | Cullen et al. | |
| 5,636,525 A | 6/1997 | Riemenschneider | |
| 5,651,266 A | * 7/1997 | Hutchison et al. | 62/474 |
| 5,996,371 A | * 12/1999 | Riemenschneider | 62/474 |
| 6,038,881 A | * 3/2000 | Murray | 62/474 |
| 6,155,072 A | 12/2000 | Sullivan et al. | |
| 6,170,288 B1 | 1/2001 | Incorvia | |
| 6,209,347 B1 | 4/2001 | Corrigan et al. | |
| 6,279,341 B1 | 8/2001 | Incorvia et al. | |
| 6,345,516 B1 | 2/2002 | Kesler et al. | |
| 6,427,477 B2 | 8/2002 | Incorvia et al. | |

* cited by examiner

*Primary Examiner*—Frank M. Lawrence
(74) *Attorney, Agent, or Firm*—Joseph P. Gastel (57) ABSTRACT

An adsorbent unit including first and second porous containers, adsorbent in the first and second porous containers, a first and second end on each of the first and second containers, a yoke connecting the first ends, spaced first apertures in the yoke, a severance in the yoke extending between and in communication with the first apertures, a tab on each of the second ends of the first and second porous containers, and a second aperture in each of the tabs.

33 Claims, 5 Drawing Sheets

SELF-RETAINING ADSORBENT UNIT

CROSS-REFERENCE TO RELATED APPLICATIONS

The present application is a continuation-in-part of application Ser. No. 10/047,651, filed Jan. 15, 2002, now U.S. Pat. No. 6,530,982.

STATEMENT REGARDING FEDERALLY SPONSORED RESEARCH OR DEVELOPMENT

Not Applicable

BACKGROUND OF THE INVENTION

The present invention relates to an improved adsorbent unit for use in a refrigerant accumulator which contains a U-bend pipe and which is used in an automotive air conditioning system.

By way of background, saddle-type of adsorbent units and other types of adsorbent units have been secured to U-bend pipes in various manners. However, there was generally a certain amount of looseness between the yoke of the adsorbent unit and the spaced pipe portions of the U-bend pipe.

BRIEF SUMMARY OF THE INVENTION

It is the object of the present invention to provide an improved saddle-type adsorbent unit which provides a fit with spaced pipe portions of a U-bend pipe so that the yoke is not distorted thereby lessening stress points thereon, and also lessening the abrasion to which the yoke is subjected due to vibration of the accumulator in which it is located.

Another object of the present invention is to provide an improved saddle-type adsorbent unit in which the yoke fits between the legs of a U-bend and contains a refrigerant tracer. Other objects and attendant advantages of the present invention will readily be perceived hereafter.

The present invention relates to an adsorbent unit comprising first and second porous containers, adsorbent in said first and second porous containers, a first and second end on each of said first and second porous containers, a yoke connecting said first ends, spaced first apertures in said yoke, a severance in said yoke extending between and in communication with said first apertures, a tab on each of said second ends of said first and second porous containers, and a second aperture in each of said tabs.

The present invention also relates to a refrigerant accumulator having a housing with a bottom wall and a side wall and a U-shaped pipe with a return bend proximate said bottom wall and with first and second pipe portions extending from said return bend along said side wall, and a filter body extending outwardly from said return bend, the improvement of an adsorbent unit comprising first and second porous containers, adsorbent in said first and second porous containers, a first and second end on each of said first and second porous containers, a yoke connecting said first ends, spaced first apertures in said yoke receiving said first and second pipe portions, a severance in said yoke extending between and in communication with said first apertures, a tab on each of said second ends of said first and second containers, and second apertures in each of said tabs receiving said filter body.

The present invention also relates to an adsorbent unit comprising first and second porous containers, adsorbent in said first and second porous containers, a first and second end on each of said first and second porous containers, a yoke connecting said first ends, a chamber in said yoke, and refrigerant tracer dye in said chamber.

The present invention also relates to a refrigerant accumulator having a housing with a bottom wall and a side wall and a U-shaped pipe with a return bend proximate said bottom wall and with first and second pipe portions extending from said return bend along said side wall, the improvement of an adsorbent unit comprising first and second porous containers, adsorbent in said first and second porous containers, a first and second end on each of said first and second porous containers, a yoke connecting said first ends, said yoke being positioned between said first and second pipe portions, a chamber in said yoke, and refrigerant tracer dye in said chamber.

The various aspects of the present invention will be more fully understood when the following portions of the specification are read in conjunction with the accompanying drawings wherein:

DETAILED DESCRIPTION OF THE INVENTION

Figure 1:
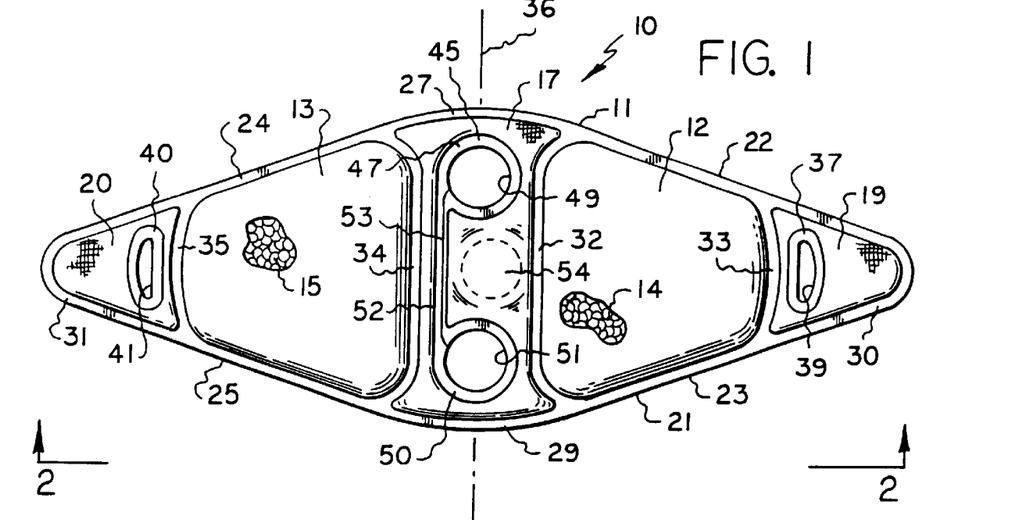
FIG. 1 is a partially broken away plan view of the adsorbent unit of the present invention.

The adsorbent unit 10 of the present invention includes a casing 11 formed of porous material, in this instance, heat-fusible felted polyester, but it may be fabricated of any other suitable material. Casing 11 is formed from two sides 11a and 11b (FIG. 2A) of felted polyester which are bonded to each other by fused seams and it comprises two adsorbent containers 12 and 13 each containing adsorbent 14 and 15, respectively. The containers 12 and 13 are secured to each other by a yoke 17. A tab 19 extends outwardly from container 12, and a tab 20 extends outwardly from container 13. The preferred adsorbent is molecular sieve but any other suitable adsorbent may be used.

The adsorbent unit 10 is defined by a fused seam 21 which extends about the entire casing 11. Fused seam 21 includes portions 22 and 23 on the sides of container 12 and portions 24 and 25 on the sides of container 13. Portion 27 of fused seam 21 connects portions 22 and 24, and portion 29 of fused seam 29 connects portions 23 and 25. Portion 30 of fused seam 21 defines the outer border of tab 19 and joins fused seam portions 22 and 23. Portion 31 of fused seam 21 defines the periphery of tab 20 and joins fused seam portions 24 and 25. Fused seam 32 defines a border of container 12 and its ends merge into portions 22 and 23 of fused seam 21. Fused seam 33 defines a common border of container 12 and tab 19, and it joins fused seam portions 22 and 23. Fused seam 34 defines the common border between container 13 and yoke 17, and its ends join fused seam portions 24 and 25. Fused seam 35 defines the common border of container 13 and tab 20 and it joins portions 24 and 25 of fused seam 21. A fused seam 37 in tab 19 defines an aperture 39. A fused seam 40 in tab 31 defines an aperture 41. All of the fused seams join the two sides 11a and 11b of the casing 11.

As can be seen from FIG. 1, containers 12 and 13 are of substantially trapezoidal shape, and tabs 19 and 20 are of substantially triangular shape. When container 12 and tab 19 are considered in combination, they approximate a triangular shape in plan. When container 13 and tab 20 are considered in combination, they also approximate a triangular shape in plan. The casing 11 is substantially symmetrical about centerline 36. Also, the ends of containers 12 and 13 at 32 and 34, respectively, are wider than the ends at 33 and 35, respectively, in accordance with their trapezoidal shapes.

Figure 4:
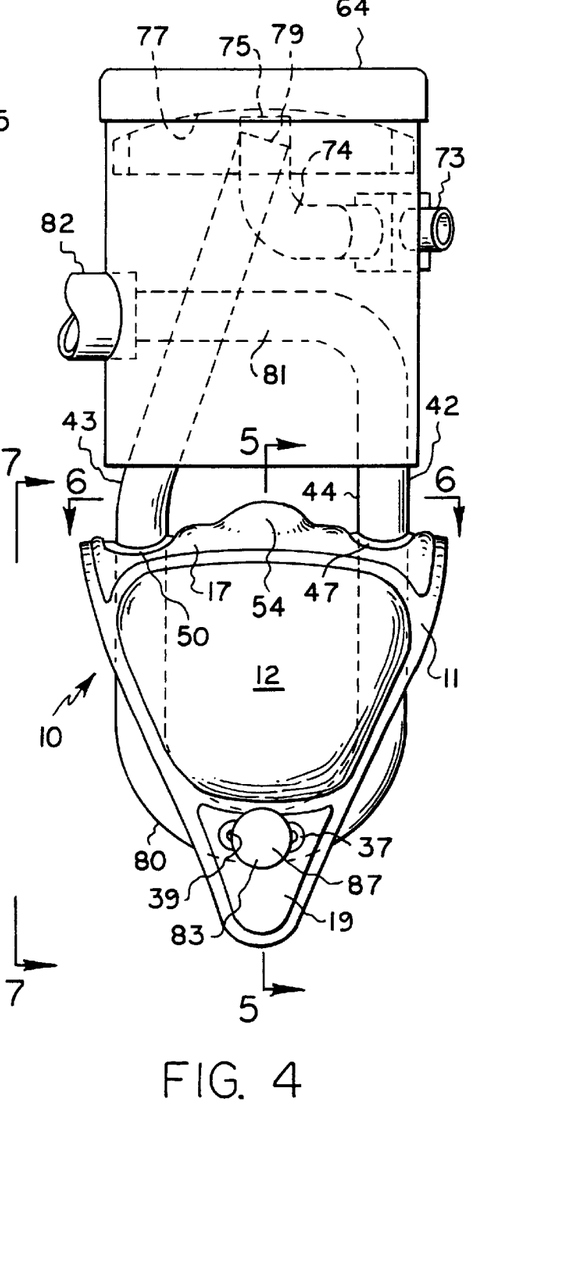
FIG. 4 is a side elevational view of the accumulator of FIG. 4 with the bottom portion removed and the adsorbent unit of the present invention mounted relative to the U-bend pipe therein.

Yoke 17 is of a construction so that it fits onto spaced pipe portions 42 and 43 of U-shaped pipe 44 (FIG. 4). In this respect yoke 17 includes a fused seam 45 which includes a circular seam portion 47 which defines an aperture 49, and it includes a circular seam portion 50 which defines an aperture 51. Fused seam portions 47 and 50 are connected by a fused seam portion 52 having a severance 53 therein in the form of a slit which is in communication with apertures 49 and 51. While the severance is shown as a slit which is in the form of a line, it will be appreciated that the severance can take the form of a narrow slot.

Figure 2:
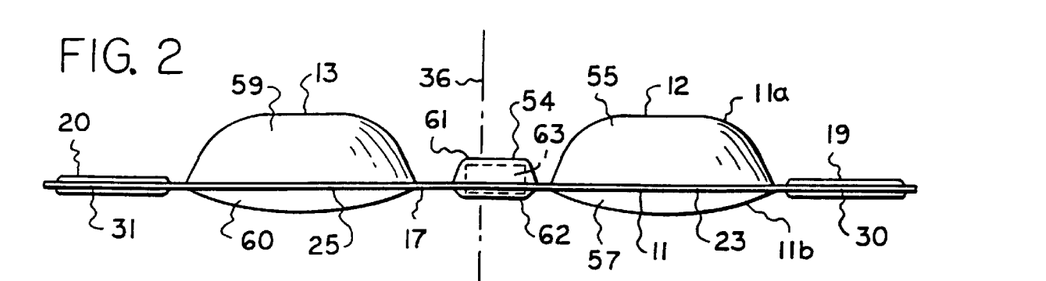
FIG. 2 is a side elevational view taken substantially in the direction of arrows 2—2 of FIG. 1.
Figure 2A:
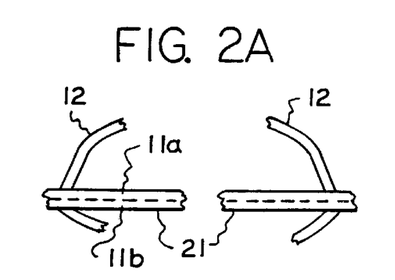
FIG. 2A is an enlarged fragmentary portion of FIG. 2.

A chamber 54 is formed in yoke 17 by a deformation side 11a of the casing 11. The side 11b merely bulges out. Container 12 includes a pronounced convex side 55 on side 11a and a less pronounced convex side 57 on side 11b. Container 13 includes a pronounced convex side 59 on side 11a and a less pronounced convex side 60 on side 11b. The compartment 54 includes a pronounced concave side 61 and a less pronounced concave side 62. A refrigerant dye tracer tablet 63 or a granular refrigerant tracer composition is contained within compartment 54.

Figure 3:
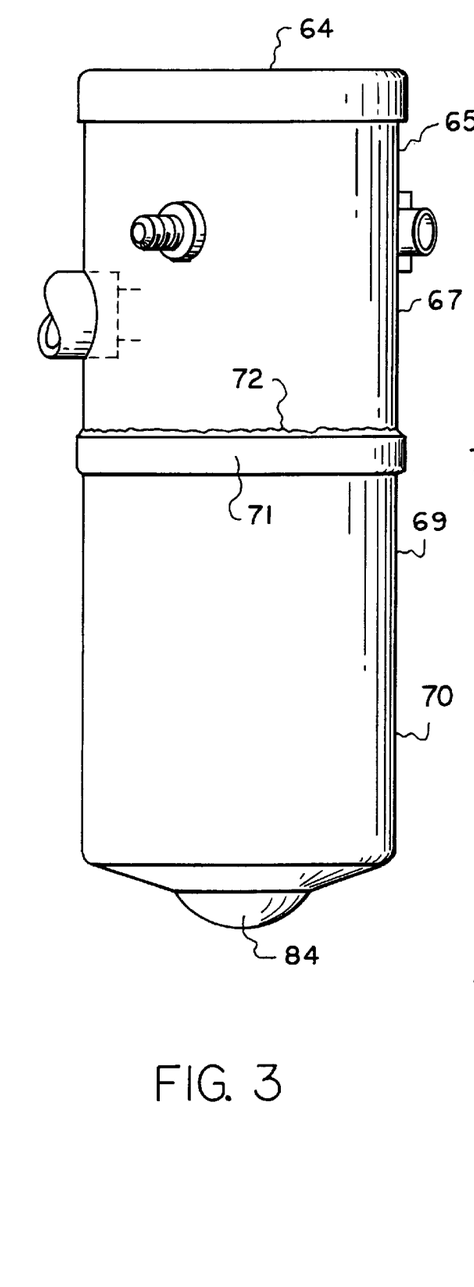
FIG. 3 is a side elevational view of an accumulator type of receiver in which the adsorbent unit of FIG. 1 is mounted.

The adsorbent unit 10 is intended to be mounted in a prior art accumulator-type of receiver 64 (FIGS. 3 and 4) which includes an upper cylindrical housing portion 65 having a cylindrical side wall 67 and a lower cylindrical housing portion 69 having a cylindrical side wall 70 and an annular flange 71 which receives the lower edge portion of side wall 67 with an interference fit, and a joint is thereafter hermetically welded at 72. Insofar as pertinent here, the accumulator 64 includes a pipe 73 which receives a mix of liquid and gas refrigerant which is conducted through pipe 74 to an outlet 75 proximate a concave portion 77 onto which the mix impinges and enters the inside of the accumulator. The upper end 79 of U-shaped pipe 44 is open, and it receives the gaseous refrigerant which passes through pipe 43, return bend 80 and pipe 42 and pipe 81 to outlet 82 which leads to the compressor, as is well known in the art. The gaseous refrigerant passes through U-shaped pipe 44 because it rises to the top of accumulator 64 while the liquid refrigerant from the evaporator drops to the bottom of the accumulator. A lubricant inlet orifice (not shown) is located at U-bend 80. A filter housing 83 having a filter therein is in communication with the lubricant inlet orifice in the return bend 80 such that lubricant which accumulates in the bottom wall 84 (FIG. 3) is induced into the return bend and conveyed with the gaseous refrigerant to the compressor, as is well known in the art.

Figure 5:
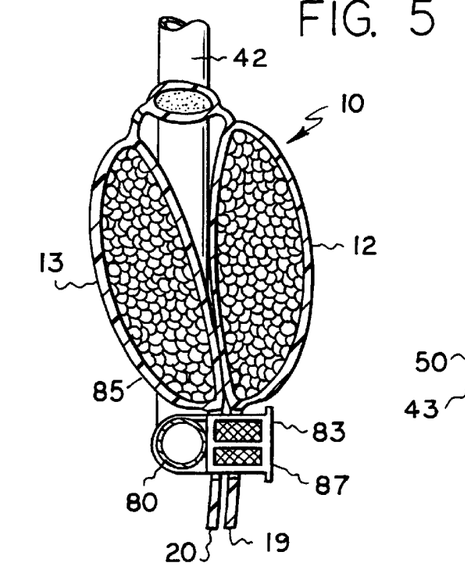
FIG. 5 is a fragmentary cross sectional view taken substantially along line 5—5 of FIG. 4.
Figure 6:
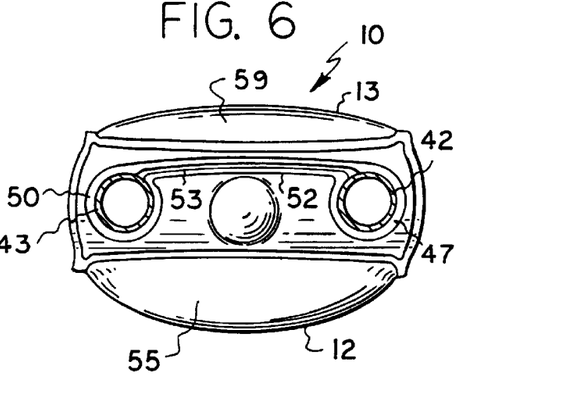
FIG. 6 is a cross sectional view taken substantially along line 6—6 of FIG. 4.
Figure 7:
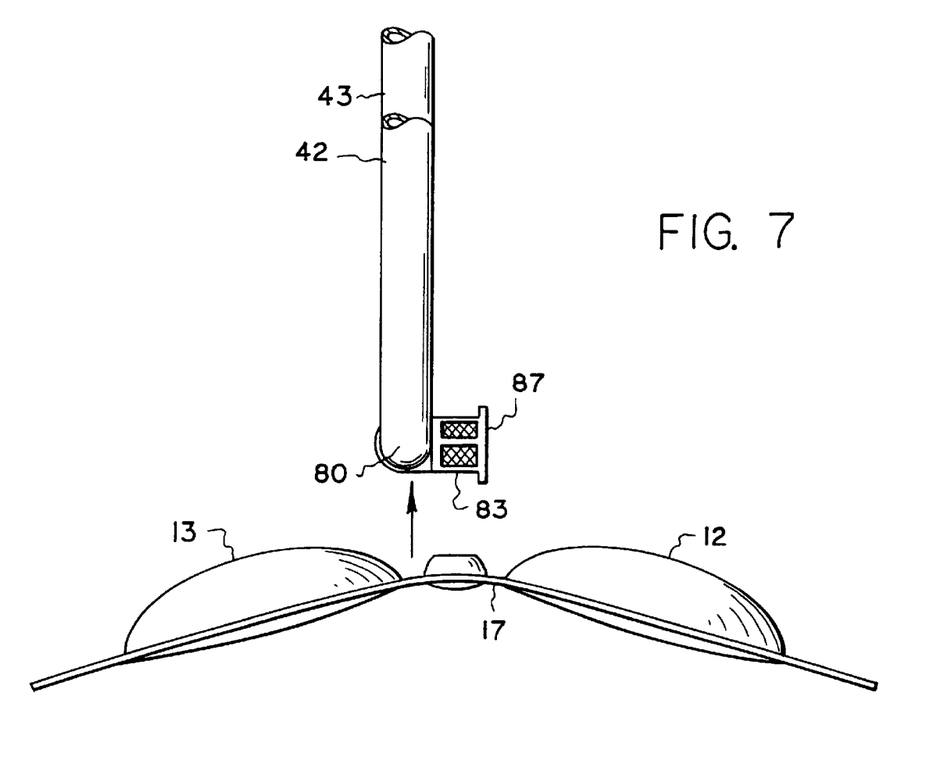
FIG. 7 is a fragmentary schematic view taken substantially in the direction of arrows 7—7 of FIG. 4 showing the first step of mounting the adsorbent unit of FIG. 1 onto the U-shaped pipe of FIG. 4.
Figure 8:
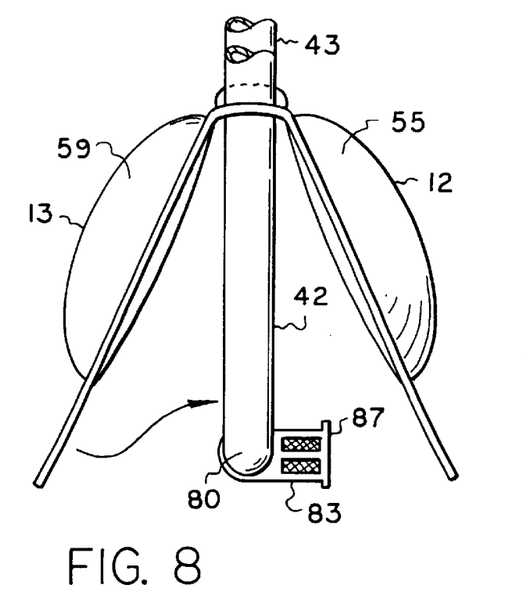
FIG. 8 is a fragmentary side elevational view showing the yoke of the adsorbent unit mounted on the spaced pipe portions of the U-shaped pipe.
Figure 9:
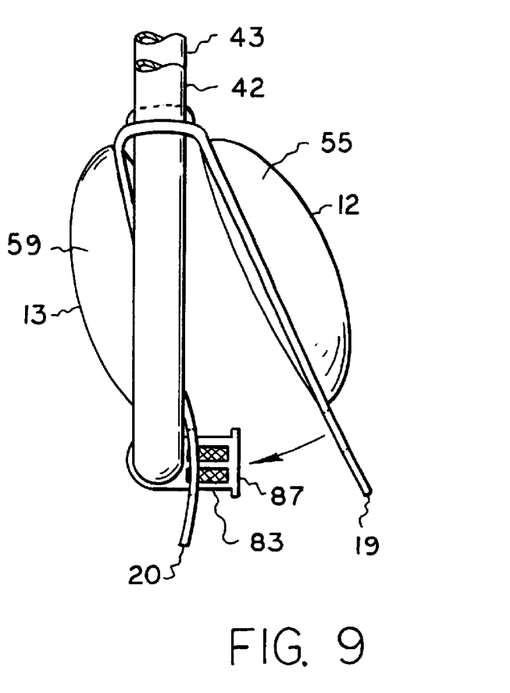
FIG. 9 is a fragmentary side elevational view showing one adsorbent container threaded through the spaced pipe portions of the U-shaped pipe.
Figure 10:
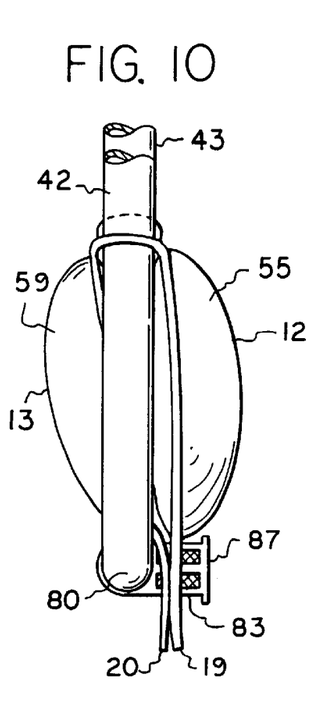
FIG. 10 is a fragmentary side elevational view showing the adsorbent unit of FIG. 1 fully mounted on the U-shaped pipe.

In FIGS. 4, 5 and 6, adsorbent unit 10 is shown in its installed position. In this respect, apertures 49 and 51 in yoke 17, which are surrounded by fused seam portions 47 and 50, respectively, receive pipe portions 42 and 43, respectively. As can be seen from FIGS. 4 and 6, the fused seam portions 47 and 50 surrounding apertures 49 and 51, respectively, make a good fit with pipe portions 42 and 43, respectively. Furthermore, the lower portion 85 (FIG. 5) of container 13 is threaded through the U-bend pipe between pipe portions 42 and 43. In addition, the tabs 19 and 20 receive filter housing 83 which is contained within apertures 39 and 41, respectively. The foregoing relationship between the adsorbent unit 10 and the U-shaped pipe 44 securely mounts the adsorbent unit onto the U-shaped pipe with a good fit.

In FIGS. 7–10 the procedure of mounting the adsorbent unit 10 onto the U-shaped pipe 44 is shown. The first step is to thread the bottom of the U-shaped pipe through slit 53 and apertures 40 and 51 in yoke 17 by passing the adsorbent unit 10 upwardly onto the U-bend pipe 42 from the position of FIG. 7 to the position shown in FIG. 8. Thereafter the container 13 is threaded through the space between pipe portions 42 and 43 to the position shown in FIG. 9, and thereafter tab 20 is mounted on filter housing 83. The last step of the mounting procedure is to mount tab 19 onto filter housing 83. The end of filter housing 83 is in the shape of a disc 87 which is larger than the diameter of the cylindrical housing 83, and this acts as a stop which prevents the tabs 19 and 20 from moving off of housing 83.

Figure 1A:
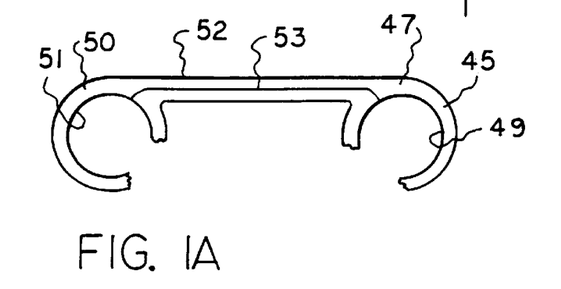
FIG. 1A is an enlarged fragmentary portion of FIG. 1.

The threading of container 13 through the space between pipe portions 42 and 43 is facilitated because of the trapezoidal shape of container 13 and the triangular shape of tab 20 with the apex of tab 20 providing a point. Also, since the casing 11 is substantially symmetrical about centerline 36 either container 12 or 13 can be the one which is threaded through the space between the pipe portions 42 and 43, depending on the initial orientation of the adsorbent unit 10 relative to the U-bend pipe. By virtue of the fit between the circular seams 47 and 50 with pipe portions 42 and 43, respectively, there are practically no distortion-producing stress points on yoke 17 when the adsorbent unit is in its fully installed position, especially considering that the fused seam portion 52 returns substantially to the positions of FIGS. 1 and 1A. In addition, the fit of apertures 49 and 50 with pipe portions 42 and 43, respectively, tends to lessen abrasion of the yoke 17 which would occur when the accumulator is vibrated during the movement of the vehicle in which it is located, especially considering that the pipe portions 42 and 43 are engaged by the hardened fused seams 49 and 50, respectively.

Figure 11:
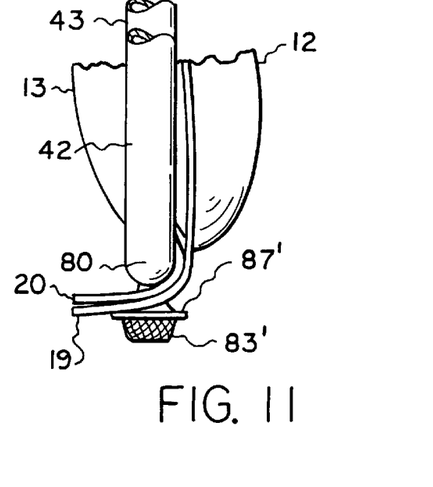
FIG. 11 is a fragmentary side elevational view of the adsorbent container of the present invention mounted on a U-shaped pipe wherein the filter housing is mounted in a different manner than in the preceding figures.

In FIG. 11 the adsorbent unit 11 is shown mounted on a U-shaped pipe which is identical in all respects to that shown in the preceding figures except that the filter housing 83' extends downwardly from U-bend 80 and its disc 87' is located as shown. The tabs 19 and 20 are mounted on filter housing 87' between disc 83' and the undersurface of U-bend 80, and that portion of the filter housing is received in apertures 39 and 41 of tabs 19 and 20, respectively.

While the apertures 49 and 50 have been shown in their preferred circular configuration, it will be appreciated that they can be of other configurations which will receive pipe portions 42 and 43 without creating appreciable distortion of yoke 17.

Figure 12:
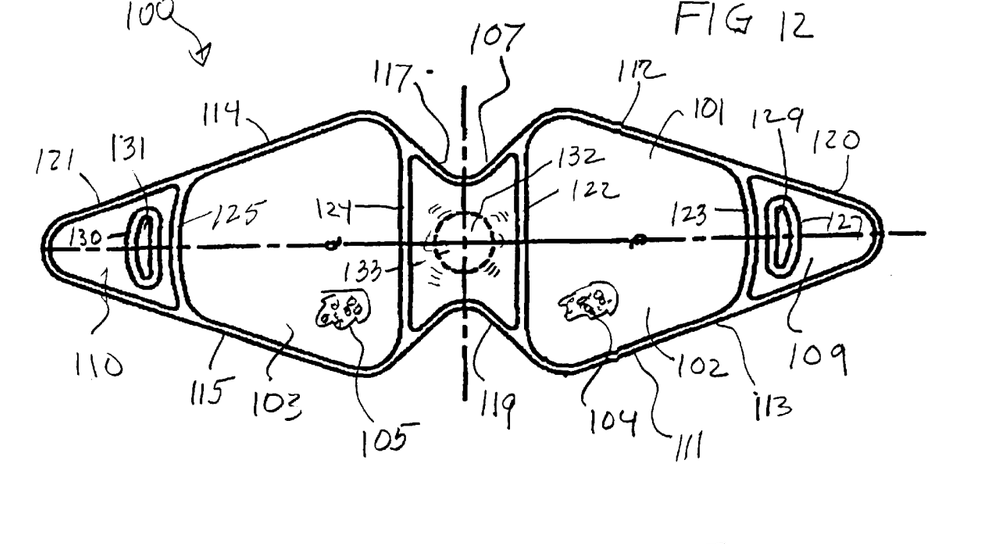
FIG. 12 is a plan view of another embodiment of the present invention.
Figure 13:
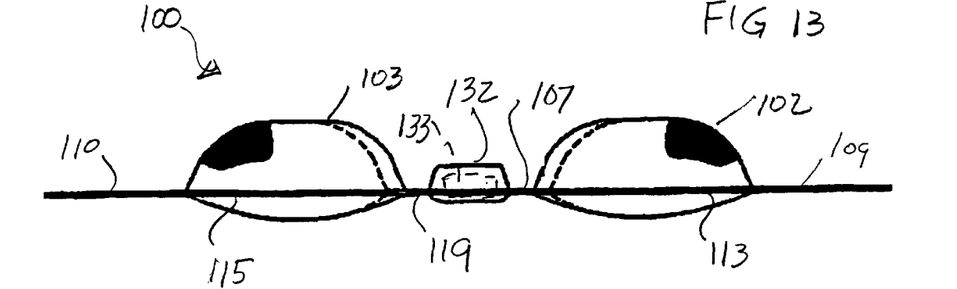
FIG. 13 is a side elevational view of the embodiment of FIG. 12.
Figure 14:
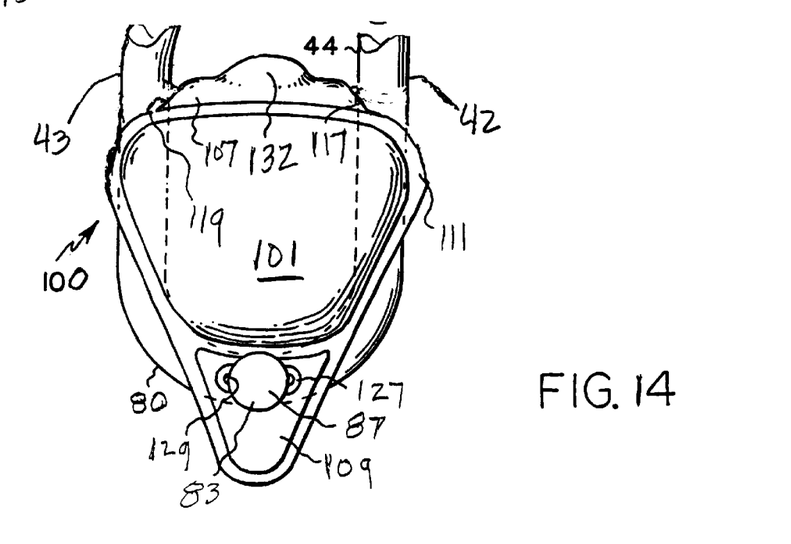
FIG. 14 is a fragmentary side elevational view showing the adsorbent unit of FIG. 12 mounted on a U-bend pipe.

In FIGS. 12–14 another embodiment of an adsorbent unit is disclosed. The adsorbent unit 100 includes a casing 101 formed of porous material, in this instance, heat-fusible polyester, but it may be fabricated of any other suitable material. Casing 101 is formed from two sides of felted polyester which are bonded to each other by fused seams, as noted above relative to the embodiment of FIGS. 1–2A. The containers 102 and 103 each contain adsorbent 104 and 105, respectively. The containers 102 and 103 are secured to each other by a yoke 107. A tab 109 extends outwardly from container 102, and a tab 110 extends outwardly from container 103. As noted above, the preferred adsorbent is molecular sieve but any other suitable adsorbent may be used.

The adsorbent unit 100 is defined by a fused seam 111 which extends around the entire casing 101. Fused seam 111 includes portions 112 and 113 on the sides of container 102 and portions 114 and 115 on the sides of container 103. Portion 117 of fused seam 111 connects portions 112 and 114, and portion 119 of fused seam 111 connects portions 113 and 115. Portion 120 of fused seam 111 defines the outer border of tab 109 and joins fused seam portions 112 and 113. Portion 121 of fused seam 111 defines the periphery of tab 110 and joins fused seam portions 114 and 115. Fused seam 122 defines a border of container 102 and its ends merge into portions 112 and 113 of fused seam 111. Fused seam 123 defines a common border of container 102 and tab 109 and it joins fused seam portions 112 and 113. Fused seam 124 defines a common border between container 103 and yoke 107, and its ends join fused seam portions 114 and 115. Fused seam 125 defines the common border of container 103 and tab 110 and it joins portions 114 and 115 of fused seam 111. A fused seam 127 in tab 109 defines an aperture 129. A fused seam 130 in tab 110 defines an aperture 131. All of the fused seams join the two opposite sides of the adsorbent unit in the same manner as discussed above relative to FIGS. 1–2A. In fact the structure so far described can be considered substantially identical to the structure described above relative to FIGS. 1–2A except for the configuration of yoke 107.

As can be seen from FIG. 12, the adsorbent unit 100 has substantially the same shape in plan except for the configuration of the yoke 107. In this respect, the ends 117 and 119 of yoke 107 have a concave configuration so that they receive the spaced pipe portions 42 and 43 of U-shaped pipe 44 of FIG. 4. In addition to the foregoing, the yoke 107 includes a chamber 132 which contains a refrigerant dye tracer tablet 133, or it can contain a granular refrigerant tracer composition.

In FIG. 14 the adsorbent unit 100 of FIG. 12 is shown mounted on U-bend pipe 42. It will be appreciated that the structure of the accumulator and the U-bend pipe are identical to that shown in FIG. 4. The only difference is in the manner in which the adsorbent unit 100 is mounted.

While the yoke 107 preferably has concave ends 117 and 119 so that it fits about pipes 42 and 43, it will be appreciated that it can be shaped with ends that are not concave. The only criterion is that the yoke should fit satisfactorily between the pipes.

While a preferred embodiment of the present invention is shown, it will be appreciated that it is not limited thereto but may be otherwise embodied within the scope of the following claims.

What is claimed is:

1. An adsorbent unit comprising first and second porous containers, adsorbent in said first and second porous containers, a first and second end on each of said first and second porous containers, a yoke connecting said first ends, spaced first apertures in said yoke, a severance in said yoke extending between and in communication with said first apertures, a tab on each of said second ends of said first and second porous containers, a second aperture in each of said tabs, a chamber in said yoke, and refrigerant tracer dye in said chamber.

2. An adsorbent unit as set forth in claim 1 wherein each of said first ends of said first and second containers are wider than said second ends.

3. An adsorbent unit as set forth in claim 2 wherein said first and second containers are of substantially trapezoidal shape.

4. An adsorbent unit as set forth in claim 3 wherein said first container in combination with said first tab is substantially in the shape of a triangle.

5. An adsorbent unit as set forth in claim 4 wherein said second container in combination with said second tab is substantially in the shape of a triangle.

6. An adsorbent unit comprising first and second porous containers, adsorbent in said first and second porous containers, a first and second end on each of said first and second porous containers, a yoke connecting said first ends, a chamber in said yoke, and refrigerant tracer dye in said chamber.

7. An adsorbent unit as set forth in claim 6 including a tab on at least one of said second ends, and an aperture in said tab.

8. An adsorbent unit as set forth in claim 7 wherein said yoke includes concave ends.

9. An adsorbent unit as set forth in claim 8 including a second tab on the other of said second ends, and a second aperture in said second tab.

10. An adsorbent unit as set forth in claim 7 including a second tab on the other of said second ends.

11. An adsorbent unit as set forth in claim 10 including a second aperture in said second tab.

12. In a refrigerant accumulator having a housing with a bottom wall and a side wall and a U-shaped pipe with a return bend proximate said bottom wall and with first and second pipe portions extending from said return bend along said side wall, the improvement of an adsorbent unit comprising first and second porous containers, adsorbent in said first and second porous containers, a first and second end on each of said first and second porous containers, a yoke connecting said first ends, said yoke being positioned between said first and second pipe portions, a chamber in said yoke, and refrigerant tracer dye in said chamber.

13. In a refrigerant accumulator as set forth in claim 12 wherein said refrigerant accumulator includes a member extending outwardly from said return bend, a tab on at least one of said second ends, and an aperture in said tab receiving said member.

14. In a refrigerant accumulator as set forth in claims 12 wherein said yoke includes concave ends.

15. In a refrigerant accumulator as set forth in claim 14 wherein said refrigerant accumulator includes a member extending outwardly from said return bend, a tab on at least one of said second ends, and an aperture in said tab receiving said member.

16. In a refrigerant accumulator as set forth in claim 13 including a second tab on the other of said second ends.

17. In a refrigerant accumulator as set forth in claim 16 including a second aperture in said second tab receiving said member.

18. An adsorbent unit comprising first and second porous containers, adsorbent in said first and second porous containers, a first and second end on each of said first and second porous containers, said first ends of said first and second porous containers being wider than said second ends, a yoke connecting said first ends, a tab on at least one of said second ends, and an aperture in said tab.

19. An adsorbent unit as set forth in claim 18 wherein said yoke includes concave ends.

20. An adsorbent unit as set forth in claim 18 including a second tab on the other of said second ends.

21. An adsorbent unit as set forth in claim 20 including a second aperture in said second tab.

22. An adsorbent unit as set forth in claim 21 wherein said yoke includes concave ends.

23. An adsorbent unit as set forth in claim 18 wherein said first and second containers are of substantially trapezoidal shape.

24. In a refrigerant accumulator having a housing with a bottom wall and a side wall and a U-shaped pipe with a return bend proximate said bottom wall and with first and second pipe portions with a space therebetween extending from said return bend within said side wall, the improvement of an adsorbent unit comprising first and second porous containers, adsorbent in said first and second porous containers, a first and second end on each of said first and second porous containers, said first ends of said first and second containers being wider than said second ends, a yoke connecting said first ends, said yoke being positioned between said first and second pipe portions, and said second end of said first container being positioned within and extending entirely through said space between said first and second pipe portions proximate said return bend.

25. In a refrigerant accumulator as set forth in claim 24 wherein said refrigerant accumulator includes a member extending outwardly from said return bend, a tab on at least one of said second ends, and an aperture in said tab receiving said member.

26. In a refrigerant accumulator as set forth in claim 25 wherein said yoke includes concave ends.

27. In a refrigerant accumulator as set forth in claim 25 including a second tab on the other of said second ends.

28. In a refrigerant accumulator as set forth in claim 27 including a second aperture in said second tab receiving said member.

29. In a refrigerant accumulator having a housing with a bottom wall and a side wall and a U-shaped pipe with a return bend proximate said bottom wall and with first and second pipe portions with a space therebetween extending from said return bend within said side wall, the improvement of an adsorbent unit comprising first and second porous containers, adsorbent in said first and second porous containers, a first and second end on each of said first and second porous containers, said first end of at least said first container being wider than said second end of said first container, a yoke connecting said first ends, said yoke being positioned between said first and second pipe portions, and said second end of said first container being positioned within and extending through said space between said first and second pipe portions proximate said return bend.

30. In a refrigerant accumulator as set forth in claim 29 wherein said refrigerant accumulator includes a member extending outwardly from said return bend, a tab on at least one of said second ends, and an aperture in said tab receiving said member.

31. In a refrigerant accumulator as set forth in claim 30 wherein said yoke includes concave ends.

32. In a refrigerant accumulator as set forth in claim 30 including a second tab on the other of said second ends.

33. In a refrigerant accumulator as set forth in claim 32 including a second aperture in said second tab receiving said member.

* * * * *

UNITED STATES PATENT AND TRADEMARK OFFICE
CERTIFICATE OF CORRECTION

PATENT NO. : 6,689,198 B2
DATED : February 10, 2004
INVENTOR(S) : Samuel A. Incorvia et al.

It is certified that error appears in the above-identified patent and that said Letters Patent is hereby corrected as shown below:

Drawings,
The sheet of formal drawings containing FIGS. 12-14 has been substituted for the sheet of informal drawings printed with the patent.

Column 3,
Line 55, change "side 1ib" to -- side 11b --.

Signed and Sealed this

Sixth Day of July, 2004

JON W. DUDAS
*Acting Director of the United States Patent and Trademark Office*